United States Patent [19]

Liebert

[11] 4,402,992
[45] Sep. 6, 1983

[54] COVERING SOLID, FILM COOLED SURFACES WITH A DUPLEX THERMAL BARRIER COATING

[75] Inventor: Curt H. Liebert, Middleburg Heights, OH

[73] Assignee: The United States of America as represented by the Administrator of the National Aeronautics and Space Administration, Washington, D.C.

[21] Appl. No.: 328,760

[22] Filed: Dec. 7, 1981

[51] Int. Cl.³ .............................................. B05D 1/08
[52] U.S. Cl. .................................... 427/34; 427/243; 427/247; 427/423
[58] Field of Search ............... 427/34, 423, 243, 245, 427/247, 244

[56] References Cited

U.S. PATENT DOCUMENTS

| | | | |
|---|---|---|---|
| 3,450,558 | 6/1969 | Whaley et al. | 117/107.2 |
| 3,892,883 | 7/1975 | Leclercq | 427/34 |
| 4,050,133 | 9/1977 | Cretella et al. | 29/156.8 B |
| 4,095,003 | 6/1978 | Weatherly et al. | 427/34 |
| 4,248,940 | 2/1981 | Goward et al. | 427/34 |
| 4,251,599 | 2/1981 | McCormick | 428/682 |
| 4,338,360 | 7/1982 | Cavanagh et al. | 427/247 |

*Primary Examiner*—John H. Newsome
*Attorney, Agent, or Firm*—Norman T. Musial; John R. Manning; Gene E. Shook

[57] ABSTRACT

This invention is directed to applying thermal barrier coating systems to hardware having passageways in the walls connecting apertures in the surface to a gas supply for film cooling. An inert gas, such as argon, is discharged through the apertures during the application of the thermal barrier coating system by plasma spraying. This flow of inert gas reduces both blocking of the holes and base metal oxidation during the coating operation.

13 Claims, 1 Drawing Figure

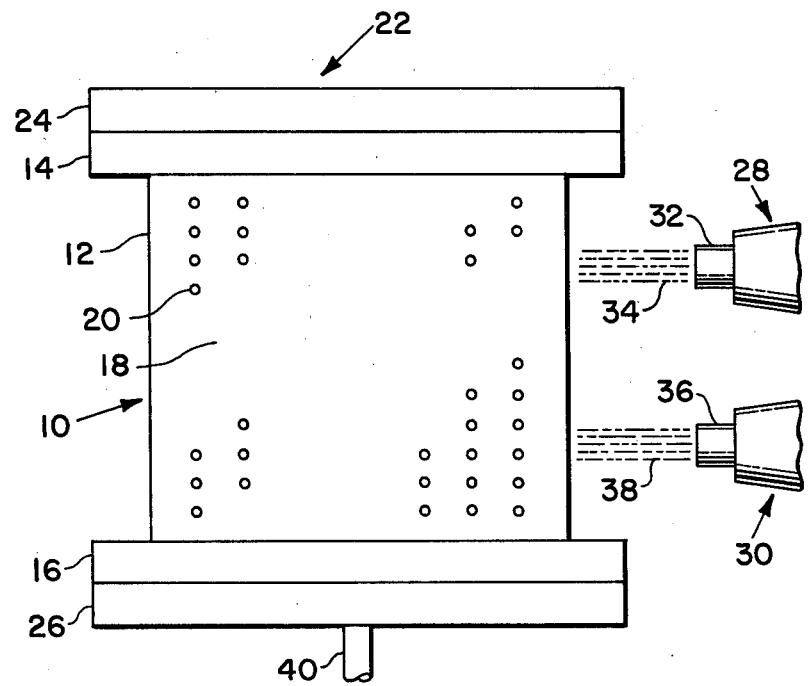

COVERING SOLID, FILM COOLED SURFACES WITH A DUPLEX THERMAL BARRIER COATING

TECHNICAL FIELD

This invention is concerned with providing corrosion resistance and thermal protection to solid film cooled hardware. The invention is particularly directed to applying thermal barrier coating system to solid, film cooled hardware.

Film cooling is used in gas turbine combustors, afterburners, transition ducts, shrouds, vanes, or blades. A gas flows from the interior of the hardware through a plurality of passageways in the metal wall to apertures in the hardware metal surface thereby forming a cooling film over the surface that is exposed to hot combustion gases. Also, various thermal barrier coating systems are used to provide corrosion resistance and thermal protection to these base matal surfaces.

When the film cooled hardware is coated with a thermal barrier coating system, the apertures usually become blocked with coating material. Also, the passageways leading from the interior of the hardware to the apertures may become blocked.

BACKGROUND ART

U.S. Pat. No. 4,050,133 to Cretella is directed to a method for refurbishing turbine vanes including a plasma spray coating process performed in an argon atmoshpere. The vanes include cooling passages in the interior portion.

U.S. Pat. No. 4,251,599 to McCormick teaches a process for plasma spray coating a metal body while cooling the surface with an external blast of inert gas. Weatherly et al U.S. Pat. No. 4,095,003 is directed to a duplex coating method comprising plasma spraying followed by heat treatment in an inert atmosphere.

DISCLOSURE OF INVENTION

In accordance with the present invention an inert gas, such as argon, is discharged through the apertures in the film cooled surfaces of the hardware during the application of the thermal barrier coating system by plasma spraying. This flow of inert gas reduces both blocking of the holes and base metal oxidation during the coating operation.

BRIEF DESCRIPTION OF THE DRAWING

The details of the invention will be more fully described when taken with the accompanying drawing which is an elevation view, partically in schematic, showing hardware being coated in accordance with the present invention.

BEST MODE FOR CARRYING OUT THE INVENTION

Referring now to the drawing, there is shown typical hardware 10 having a curved configuration that is of the type found in gas turbine engines. More particularly, the hardware 10 may be a part of a combustor, an afterburner, a transition duct, a shroud, or a vane or blade. The hardware 10 is intended to be used in a high temperature environment where it is exposed to hot combustion gases. The hardware 10 comprises an airfoil portion 12 mounted between end walls or platforms 14 and 16.

Provision is made for film cooling the surface 18 of the airfoil portion 12, A plurality of apertures and passageways 20 extend from the surface 18 to a suitable plenum chamber or supply passage, not shown, in the interior of the airfoil portion.

When the turbine is operating, a cooling gas flows through the passageways 20 to form a cooling film over the surface 18 in a manner well known in the art. Apertures and passageways having diameters between 0.010 inch and 0.020 inch have been adequate to supply the required amount of cooling gas for this film.

A thermal barrier coating system is relied on additionally to provide corrosion resistance and thermal protection to the hardware 10. Such a system may be of a two-layered duplex type disclosed in U.S. Pat. No. 4,055,705 to Stecura and Liebert or of the graded type disclosed in U.S. Pat. No. 4,248,940 to Goward et al.

According to the present invention the hardware 10 to be coated is clamped in a fixture 22 which properly positions it for the coating operation. The fixture 22 includes a pair of spaced plates 24 and 26 which engage and seal both ends of the hardware 10 at the end walls 14 and 16, respectively.

A pair of plasma spray guns 28 and 30 are provided for supplying the materials for the thermal barrier coating system. The gun 28 has a nozzle 32 from which there emanates a fine spray 34 of particles of bonding metal. The spray 34 is preferably NiCrAlY or CoCrAlY.

The gun 30 has a nozzle 36 from which there emanates a fine spray 38 of barrier coating material. Yttria stabilized zirconia has given satisfactory results as a thermal barrier material.

An important feature of the invention is the provision of a conduit 40 which places the interior of the hardware 10 in communciation with a supply of inert gas, such as argon, which is under pressure. It has been found that argon under a pressure of 80 psia produces an adequate flow through the apertures 20 to prevent their clogging.

In operation, the argon under the pressure 80 psia flows through the conduit 40 to the interior of the hardware 10. This argon then discharges from the film cooling holes 20 in the surface 18 at a mass flow rate of 0.005 to 0.015 $lb_m$/second.

The surface 18 is first degreased and then roughened by grit blasting. Excess grit is removed from the interior of the hardware 10 with an oil free air blast.

A bond coating is supplied through the gun 28 to the nozzle 32. The bond coating is deposited on the surface 18 to a thickness between 0.002 inch and 0.004 inch while the argon gas is passing through the apertures 20 thereby reducing the blockage.

After the bond coating has been applied, a ceramic coating is supplied from the spray gun 30 and the nozzle 36 to a thickness of between 0.004 to 0.010 inch. Here again, the flow of the argon from the holes 20 inhibits blocking and reduces base metal oxidation during the coating application.

Silicon carbide paper having an A weight and 600 size is used to polish or smooth the exposed ceramic surface. A roughness of 1 to 3 micrometers (RMS) has been found to be satisfactory. Any grit remaining within the hardware 10 is removed with an oil free air blast.

While the peferred embodiment of the invention has been disclosed and described, it will be appreciated if various modifications my be made to the invention without departing from the spirit of the invention and the scope of the subjoined claims.

I claim:

1. A method of applying a thermal barrier coating system to a member having a plurality of passages therein extending from a surface thereof to a plenum chamber to accommodate an outward flow of fluid to provide film cooling in a high temperature environment comprising the steps of supplying a fluid under pressure to said plenum chamber whereby said fluid flows outward through said passages, plasma spraying a metal bond coat onto said surface having the passages therein while said fluid flows through said passages, and depositing a thermal barrier coating material on said metal bond coat while said fluid flows through said passages whereby entry of said coating material into said passages is prevented thereby inhibiting blockage thereof and reducing base metal oxidation.

2. A method of applying a thermal barrier coating system as claimed in claim 1 including the step of roughening said surface of said member having the pasages therein prior to plasma spraying the metal bond coating onto said surface.

3. A method of applying a thermal barrier coating system as claimed in claim 1 wherein the fluid under pressure in the plenum chamber is an inert gas.

4. A method of applying a thermal barrier coating system as claimed in claim 3 wherein the inert gas is argon.

5. A method of applying a thermal barrier coating system as claimed in claim 4 wherein the argon gas is suppled under a pressure of about 80 psia.

6. A method of applying a thermal barrier coating system as claimed in claim 5 wherein the mass flow rate of the argon through the passages is between about 0.005 and 0.015 $lb_m$/second.

7. A method of applying a thermal barrier coating system as claimed in claim 1 wherein the metal bond coat is selected from the group consisting of NiCrAlY and CoCrAlY.

8. A method of applying a thermal barrier coating system as claimed in claim 7 wherein the surface having the passages therein is curved and the metal bond coat is deposited on said curved surface to a thickness between about 0.002 inch and 0.004 inch while the fluid is passing through the passages.

9. A method of applying a thermal barrier coating system as claimed in claim 1 wherein a ceramic material is deposited on the metal bond coat by plasma spraying.

10. A method of applying a thermal barrier coating system as claimed in claim 9 wherein the ceramic material is yttria stabilized zirconia.

11. A method of applying a thermal barrier coating system as claimed in claim 10 whrein the yttria stabilized zirconia is plasma sprayed to a thickness between about 0.004 inch and 0.010 inch.

12. A method of applying a thermal barrier coating system as claimed in claim 11 including the step of polishing the exposed ceramic surface.

13. A method of applying a thermal barrier coating system as claimed in claim 12 wherein the ceramic surface is polished to a roughness of 1 to 3 micrometers (RMS).

* * * * *